United States Patent
Kato

(10) Patent No.: US 8,350,912 B2
(45) Date of Patent: Jan. 8, 2013

(54) IMAGE SENSOR AND IMAGE SENSOR SYSTEM

(75) Inventor: Shuhei Kato, Shiga (JP)

(73) Assignee: SSD Company Limited, Shiga (JP)

(*) Notice: Subject to any disclaimer, the term of this patent is extended or adjusted under 35 U.S.C. 154(b) by 694 days.

(21) Appl. No.: 12/375,641

(22) PCT Filed: Aug. 3, 2007

(86) PCT No.: PCT/JP2007/000837
§ 371 (c)(1),
(2), (4) Date: Nov. 14, 2009

(87) PCT Pub. No.: WO2008/015796
PCT Pub. Date: Feb. 7, 2008

(65) Prior Publication Data
US 2010/0141769 A1  Jun. 10, 2010

(30) Foreign Application Priority Data
Aug. 4, 2006  (JP) .................................. 2006-213984
Aug. 9, 2006  (JP) .................................. 2006-216332

(51) Int. Cl.
*H04N 5/33* (2006.01)
(52) U.S. Cl. .................. 348/164; 348/158; 348/302
(58) Field of Classification Search .............. 348/158, 348/159, 164, 229.1, 302
See application file for complete search history.

(56) References Cited

U.S. PATENT DOCUMENTS

| 5,705,807 | A | 1/1998 | Throngnumchai et al. |
| 6,144,366 | A | 11/2000 | Numazaki et al. |
| 7,609,291 | B2 * | 10/2009 | Oon et al. ................... 348/164 |
| 7,627,364 | B2 * | 12/2009 | Sato ............................ 600/473 |
| 7,777,169 | B2 * | 8/2010 | Hong ........................ 250/208.1 |
| 7,952,629 | B2 * | 5/2011 | Cieslinski ................... 348/294 |
| 8,018,510 | B2 * | 9/2011 | Murata et al. ............... 348/294 |
| 8,139,055 | B2 * | 3/2012 | Brown ........................ 345/207 |
| 2002/0122129 | A1 * | 9/2002 | Lee ............................. 348/308 |
| 2004/0195491 | A1 * | 10/2004 | Machida .................. 250/208.1 |
| 2005/0143652 | A1 * | 6/2005 | Sato ............................ 600/431 |
| 2006/0119718 | A1 * | 6/2006 | Hur et al. .................... 348/302 |
| 2006/0221221 | A1 * | 10/2006 | Furukawa et al. .......... 348/302 |
| 2009/0046187 | A1 * | 2/2009 | Ooshima et al. ........... 348/302 |
| 2010/0188330 | A1 * | 7/2010 | Ueshima .................... 345/156 |
| 2012/0026373 | A1 * | 2/2012 | Tay ............................. 348/302 |

FOREIGN PATENT DOCUMENTS
JP   8122149 A   5/1996
JP   8307772 A   11/1996

OTHER PUBLICATIONS

International Search Report, Oct. 29, 2007, from International Phase of the instant application.

(Continued)

*Primary Examiner* — Lashonda Jacobs
(74) *Attorney, Agent, or Firm* — Jackson Patent Law Office

(57) ABSTRACT

A CMOS image sensor 1 outputs a differential signal (VF−VU) between a pixel signal (VF) in a period when a LED 7 is turned on in an exposure period and a pixel signal (VU) in a period when the LED 7 is turned off in the exposure period. This does not obtain a difference between a pixel signal in an exposure period and a pixel signal in a non-exposure period. It is possible to increase simplicity in utilization as well as suppressing fixed pattern noise by generating the difference between pixel signals in different exposure spans from each other.

22 Claims, 4 Drawing Sheets

OTHER PUBLICATIONS

English Translation of the Written Opinion of the International Search Authority, Feb. 6, 2009, from International Phase of the instant application.

English Translation of International Preliminary Report on Patentability Chapter I, Feb. 10, 2009, from International Phase of the instant application.

* cited by examiner

IMAGE SENSOR AND IMAGE SENSOR SYSTEM

TECHNICAL FIELD

The present invention relates to an image sensor and the related arts for picking up an image of an object.

BACKGROUND ART

In accordance with Patent Document 1, a CDS circuit removes fixed pattern noise of a CMOS image sensor. This CDS circuit samples a signal voltage from a pixel (in an exposure period) and a state of only background noise without a signal voltage (in a non-exposure period), and then obtains a difference therebetween to remove the noise.

Patent Document 1: Japanese Unexamined Patent Application Publication No. 2002-64751

DISCLOSURE OF THE INVENTION

Problem to be Solved by the Invention

It is an object of the present invention to provide a novel image sensor and the related techniques thereof capable of generating a difference between pixel signals in different exposure spans from each other to increase simplicity in utilization as well as suppressing fixed pattern noise.

Solution of the Problem

In accordance with a first aspect of the present invention, a image sensor comprising: a plurality of light receiving elements arranged in a reticular pattern; and a difference unit operable to generate a difference between outputs from said light receiving element in different exposure spans from each other to output it as a pixel signal.

In accordance with this configuration, since the difference between the pixel signals in the different exposure spans from each other, it is possible to increase simplicity in utilization of the image sensor as well as suppressing fixed pattern noise.

For example, said difference unit generates the difference between the output from said light receiving unit in a period when a light emitting element emits light in the exposure span of said image sensor and the output in a period when the light emitting element does not emit the light in the exposure span of said image sensor.

In this case, since the image sensor outputs the difference between the pixel signal in the period when the light emitting element emits the light in the exposure span and the pixel signal in the period when the light emitting element does not emit the light in the exposure span, an external information processing unit (e.g., the multiprocessor 3) is not required complicated control for the image sensor. That is, if the information processing unit makes the image sensor output the image signal in the light emitting period and the image signal in the non-light emitting period of the light emitting element separately to calculate the difference therebetween, programming for the information processing unit is considerably restricted by the specifications of the image sensor. In this case, the image sensor has the ascendancy. However, in accordance with the present invention, since the image sensor generates the differential signal, the information processing unit can have the ascendancy without the restriction on the basis of the specifications of the image sensor.

Also, in this case, since the difference between the pixel signal in the period when the light emitting element emits the light in the exposure span and the pixel signal in the period when the light emitting element does not emit the light in the exposure span is outputted, the process for detecting the object by the external information processing unit (e.g., the multiprocessor 3) becomes simplified. That is, the information processing unit is not required the process for obtaining the difference between the image in the light emitting period and the image in the non-light emitting period of the light emitting element, and therefore it is possible to reduce the processing load thereof. Furthermore, the information processing unit can detect the object with high speed. For comparison, if the information processing unit receives the image in the light emitting period and the image in the non-light emitting period to obtain the difference, since the software obtains the difference, the processing becomes late.

In the above image sensor, said difference unit is controlled by a control signal outputted from an external information processing unit which operates in accordance with a computer program. For example, said difference unit is a CDS (Correlated Double Sampling) circuit. Also, for example, said light is infrared light. For example, said image sensor is a CMOS image sensor.

In accordance with a second aspect of the present invention, an image sensor system comprising: an image sensor; a light emitting unit; and an information processing unit, which operates in accordance with a computer program, wherein said image sensor including: a plurality of light receiving elements arranged in a reticular pattern; and a difference unit operable to generate a difference between an output from said light receiving unit in a period when said light emitting unit emits light in an exposure span of said image sensor and an output in a period when said light emitting unit does not emit the light in an exposure span of said image sensor to output it as a pixel signal, wherein said light emitting unit including: a light emitting element operable to emit the light; and a driving unit operable to drive said light emitting element in accordance with control by said information processing unit.

In accordance with this configuration, since the image sensor system has the same image sensor as image sensor in accordance with the first aspect, the image sensor system has the same advantage as the image sensor in accordance with the first aspect.

In the above image sensor system, said information processing unit including: a detecting unit operable to receive the plurality of the pixel signals corresponding to said plurality of the light emitting elements to detect an object picked up by said image sensor.

In accordance with this configuration, since the information processing unit can detect the object, it is possible to provide the various applications of the present system.

Also, said information processing unit further including: a video generating unit operable to generate a video signal based on a result of detection by said detecting unit.

In accordance with this configuration, since the video signal is generated based on the result of the detection of the detecting unit, it is possible to extend the applications of the present system.

Further, said information processing unit further including: an audio generating unit operable to generate an audio signal based on a result of detection by said detecting unit.

In accordance with this configuration, since the audio signal is generated based on the result of the detection of the detecting unit, it is possible to extend the applications of the present system.

In the above image sensor system, said difference unit is a CDS (Correlated Double Sampling) circuit.

Also, the light which said light emitting unit emits is infrared light, said image sensor system further comprising: an infrared light filter through which only infrared light passes, wherein said image sensor picks up an image through said infrared light filter. For example, said image sensor is a CMOS image sensor.

BRIEF DESCRIPTION OF DRAWINGS

The novel features of the present invention are set forth in the appended any one of claims. The invention itself, however, as well as other features and advantages thereof, will be best understood by reference to the detailed description of specific embodiments which follows, when read in conjunction with the accompanying drawings, wherein:

EXPLANATION OF REFERENCES

1 . . . CMOS image sensor, 3 . . . multiprocessor, 5 . . . LED driving circuit, 7 . . . infrared light filter, 10 . . . pixel, 11 . . . retroreflective sheet, 20 . . . CDS circuit, PD . . . photodiode, MA . . . amplifier, MS . . . switch, BL . . . column signal line, WL . . . row select line.

BEST MODE FOR CARRYING OUT THE INVENTION

In what follows, an embodiment of the present invention will be explained in conjunction with the accompanying drawings. Meanwhile, like references indicate the same or functionally similar elements throughout the respective drawings, and therefore redundant explanation is not repeated.

Figure 1:
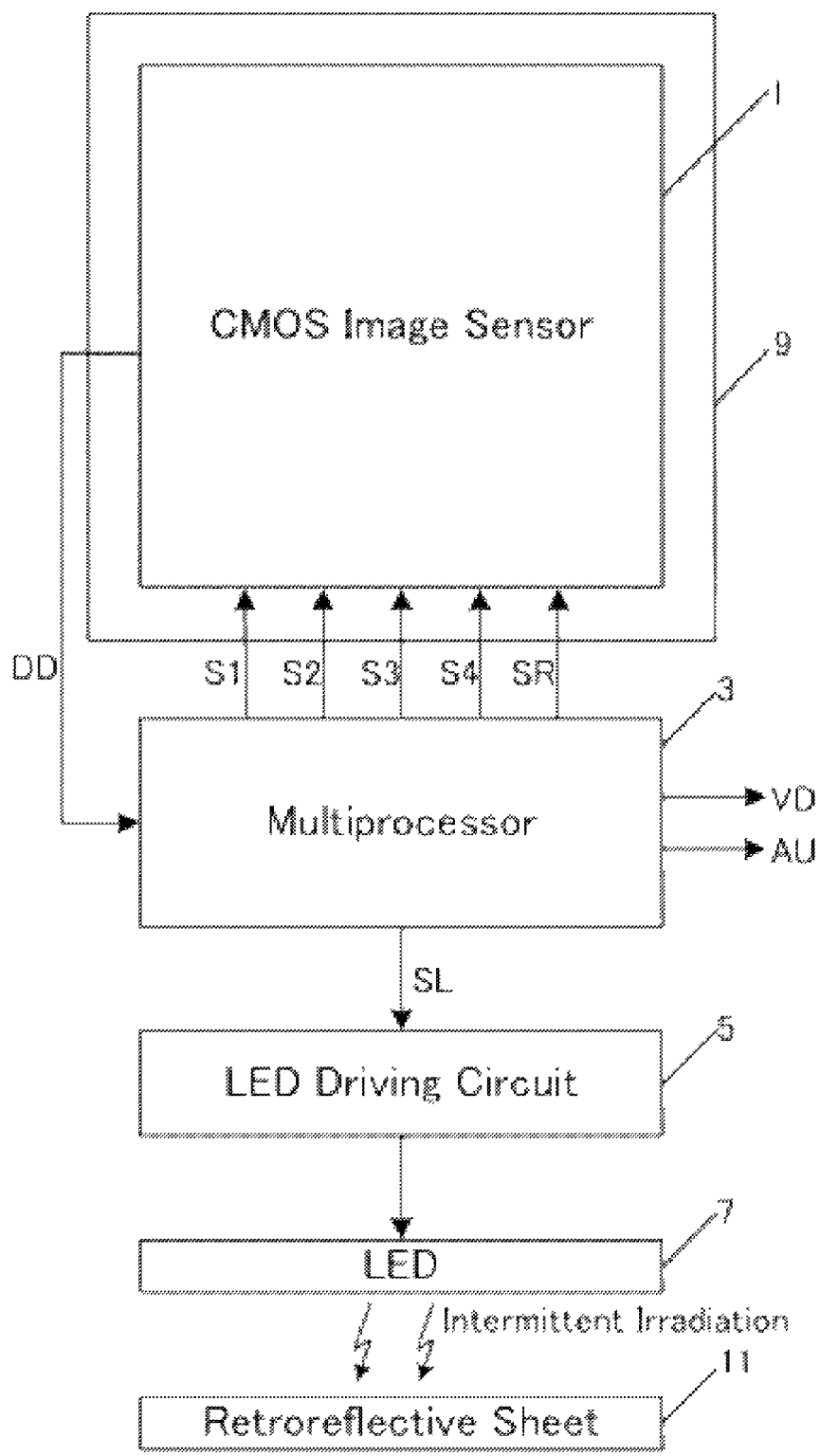
FIG. 1 is a block diagram showing the entire configuration of an image sensor system in accordance with an embodiment of the present invention.

FIG. 1 is a block diagram showing the entire configuration of an image sensor system in accordance with an embodiment of the present invention. Referring to FIG. 1, the image sensor system in accordance with the present embodiment is provided with a CMOS (Complementary Metal-Oxide Semiconductor) image sensor 1 (hereinafter referred to as "image sensor"), a multiprocessor 3, an LED (Light Emitting Diode) driving circuit 5, an infrared light emitting diode (LED) 7, and an infrared light filter 9.

The multiprocessor 3 generates an LED driving signal SL to control the LED driving circuit 5. The LED driving circuit 5 responds to the LED driving signal SL and turns on the LED 7 intermittently. Accordingly, the LED 7 intermittently irradiates the retroreflective sheet 11 as an object with infrared light.

The retroreflective sheet 11 reflects the infrared light irradiated by the LED 7. The reflected infrared light is inputted to the CMOS image sensor 1 via the infrared light filter 9 through which only infrared light can pass. Hence, in this case, levels of pixel signals (brightness values) corresponding to the retroreflective sheet 11 of an image signal generated by the CMOS image sensor 1 are higher. On the other hand, the CMOS image sensor 1 performs image pick-up process even when the LED 7 is turned off. In this case, since the LED 7 is turned off, the retroreflective sheet 11 can not reflect the infrared light of the LED 7. Accordingly, in this case, levels of most pixel signals of an image signal generated by the CMOS image sensor 1 are lower.

The CMOS image sensor 1 obtains a differential image signal between an image signal in a period when the LED 7 is turned on in an exposure period and an image signal in a period when the LED 7 is turned off in the exposure period, and then outputs the differential image signal to the multiprocessor 3.

The reason for obtaining the difference will be described. Since the infrared light filter 9 is arranged, light other than the infrared light does not enter the CMOS image sensor 1. As the result, the differential image signal generated by the CMOS image sensor 1 does not contain an image of a fluorescent light source which does not include infrared light practically. However, the infrared light filter 9 can not prevent images of sunlight and an incandescent lamp which include infrared rays to be contained. These images can be removed by obtaining the difference. Accordingly, the image of the retroreflective sheet 11 with the high brightness and the image with the low brightness which the infrared light filter 9 and the difference process can not remove remain in the differential image signal from the CMOS image sensor 1.

The differential image signal outputted from the CMOS image sensor contains the predetermined number of differential pixel data items DD. In the present embodiment, for example, resolution of the CMOS image sensor 1 is 64 pixels×64 pixels. Thus, the CMOS image sensor 1 outputs 4096 differential pixel data items DD to the multiprocessor 3.

The multiprocessor 3 receives the differential image signal, and then applies a predetermined process to the differential image signal to detect the retroreflective sheet 11. An example of the predetermined process will be given. For example, the each differential pixel data item DD is compared with a threshold value, the differential pixel data item which is not more than the threshold value is set to 0 while the differential pixel data item which exceeds the threshold value is set to 1, and thereby the differential image signal is binarized to detect the retroreflective sheet 11. In this case, the threshold value may be fixed or set dynamically. Also, for example, the maximum value is extracted from all the differential pixel data items DD, and then the pixel having the maximum value is treated as a representative point.

The multiprocessor 3 executes a graphics process and a sound process based on the detection result of the retroreflective sheet 11 in accordance with a computer program, and generates a video signal VD and an audio signal AU to which the detection result of the retroreflective sheet 11 is reflected. These signals VD and AU are supplied with a display device (e.g., a television receiver) and a speaker, and thereby the display device displays pictures and the speaker outputs sound.

Also, the multiprocessor 3 gives control signals S1 to S4 and a reset signal SR to the CMOS image sensor 1 to control the CMOS image sensor 1. See below for further details.

Further, the internal configuration of the multiprocessor 3 will be described simply. Although not shown in the figure, the multiprocessor 3 is provided with a central processing unit (referred to as the "CPU" in the following description), a graphics processing unit (referred to as the "GPU" in the following description), a sound processing unit (referred to as the "SPU" in the following description), a geometry engine (referred to as the "GE" in the following description), an external interface block, a main RAM, an A/D converter (referred to as the "ADC" in the following description) and so forth.

The CPU executes a computer program to perform various operations and control the overall system. The CPU performs the process relating to graphics operations, which are performed by running the computer program, such as the calculation of the parameters required for the expansion, reduction, rotation and/or parallel displacement of the respective objects and sprites and the calculation of eye coordinates (camera coordinates) and view vector.

The GPU serves to generate three-dimensional images composed of polygons and sprites on a real time base, and converts them into an analog composite video signal. The SPU generates PCM (pulse code modulation) wave data, amplitude data, and main volume data, and generates an analog audio signal from them by analog multiplication. The GE performs geometry operations for displaying the three-dimensional images. Specifically, the GE executes arithmetic operations such as matrix multiplications, vector affine transformations, vector orthogonal transformations, perspective projection transformations, the calculations of vertex brightnesses/polygon brightnesses (vector inner products), and polygon back face culling processes (vector cross products).

The external interface block is an interface with peripheral devices (the CMOS image sensor 1 and the LED driving circuit 5 in the case of the present embodiment) and includes programmable digital input/output (I/O) ports of 24 channels. The ADC is connected to analog input ports of 4 channels and serves to convert an analog signal, which is input from an analog input device (the CMOS image sensor 1 in the case of the present embodiment) through the analog input port, into a digital signal. The main RAM is used by the CPU as a work area, a variable storing area, a virtual memory system management area and so forth.

By the way, for example, the retroreflective sheet 11 as described above is worn on a hand of a person. Thus, the multiprocessor 3 detects the retroreflective sheet 11 to detect the motion of the person. Needless to say, the retroreflective sheet 11 may be worn on any part depending on a part to be detected. Also, in the case where the retroreflective sheet 11 is attached to an article, a person moves the article, and the multiprocessor 3 detects the movement of the article.

Figure 2:
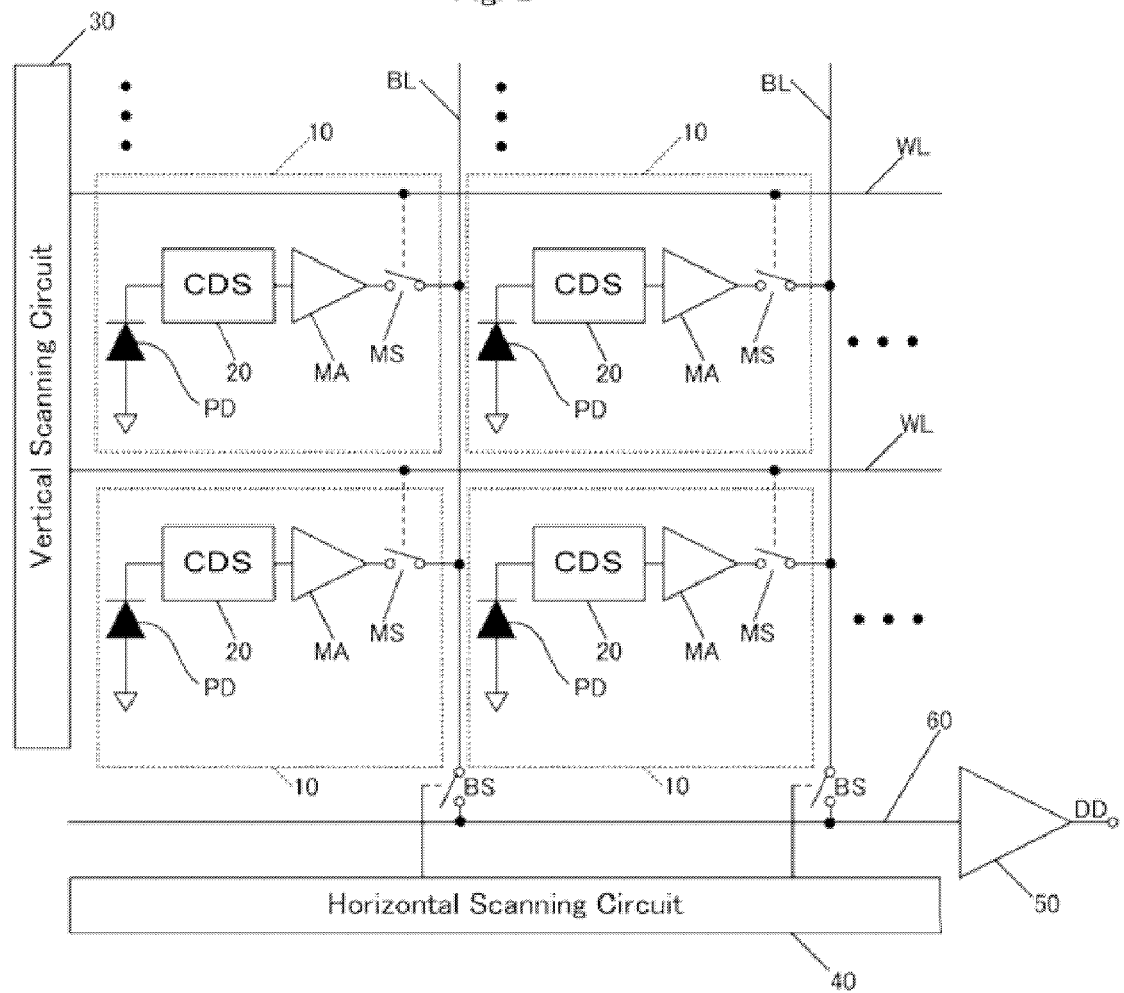
FIG. 2 is a view for showing the internal configuration of the CMOS image sensor 1 of FIG. 1.

FIG. 2 is a view for showing the internal configuration of the CMOS image sensor 1 of FIG. 1. Referring to FIG. 2, the CMOS image sensor 1 is provided with 64×64 pixels 10, a vertical scanning circuit 30, a horizontal scanning circuit 40, and an output circuit 50. The pixels 10 are arranged in a reticular pattern. Also, the CMOS image sensor 1 includes row select lines WL and column signal lines BL. The row select lines WL extend in a horizontal direction from the vertical scanning circuit 30 while the column signal lines BL extend in a vertical direction. The plurality of the row select lines WL is arranged in the vertical direction while the plurality of the column signal lines BL is arranged in the horizontal direction. The plurality of the column signal lines BL is connected with one contact points of a plurality of column select switches BS, and the other contact points of the plurality of the column select switches BS is connected with an output line 60. And, the each pixel 10 is arranged corresponding to the each intersection of the column signal lines BL with the row select lines WL. Incidentally, when it is necessary to specify the row select line, a suffix is attached to the reference "WL". Also, when it is necessary to specify the column select switch, a suffix is attached to the reference "BS".

The each pixel 10 includes a photodiode PD, a CDS (Correlated Double Sampling) circuit 20, an amplifier MA, and a switch MS. The CDS circuit 20 obtains the difference between the output in the period when the LED 7 is turned on in the exposure period and the output in the period when the LED 7 is turned off in the exposure period, and then outputs the differential pixel signal to the amplifier MA. The amplifier MA amplifies the differential pixel signal as inputted, and then outputs it. The vertical scanning circuit 30 activates the row select lines WL one by one (vertical scanning). The switch MS of the pixel 10 which is connected with the row select line WL as activated is turned on. As the result, the differential pixel signal outputted from the amplifier MA of the pixel is outputted to the corresponding column signal BL. The horizontal scanning circuit 40 turns on the column select switch BS one by one (horizontal scanning). As the result, the differential pixel signal of the column signal line BL which is connected with the column select switch BS as turned on is supplied with the output line 60, and outputted as the differential pixel data item DD through the output circuit 50. As described above, the differential pixel signals of all the pixels 10 are outputted as the differential pixel data items DD. Incidentally, the column select switch BS is turned on when the column select signal from the horizontal scanning circuit 40 is at a high level, and is turned off when the column select signal is at a low level. Also, "BS" may be used as the reference of the column select signal.

Figure 3:
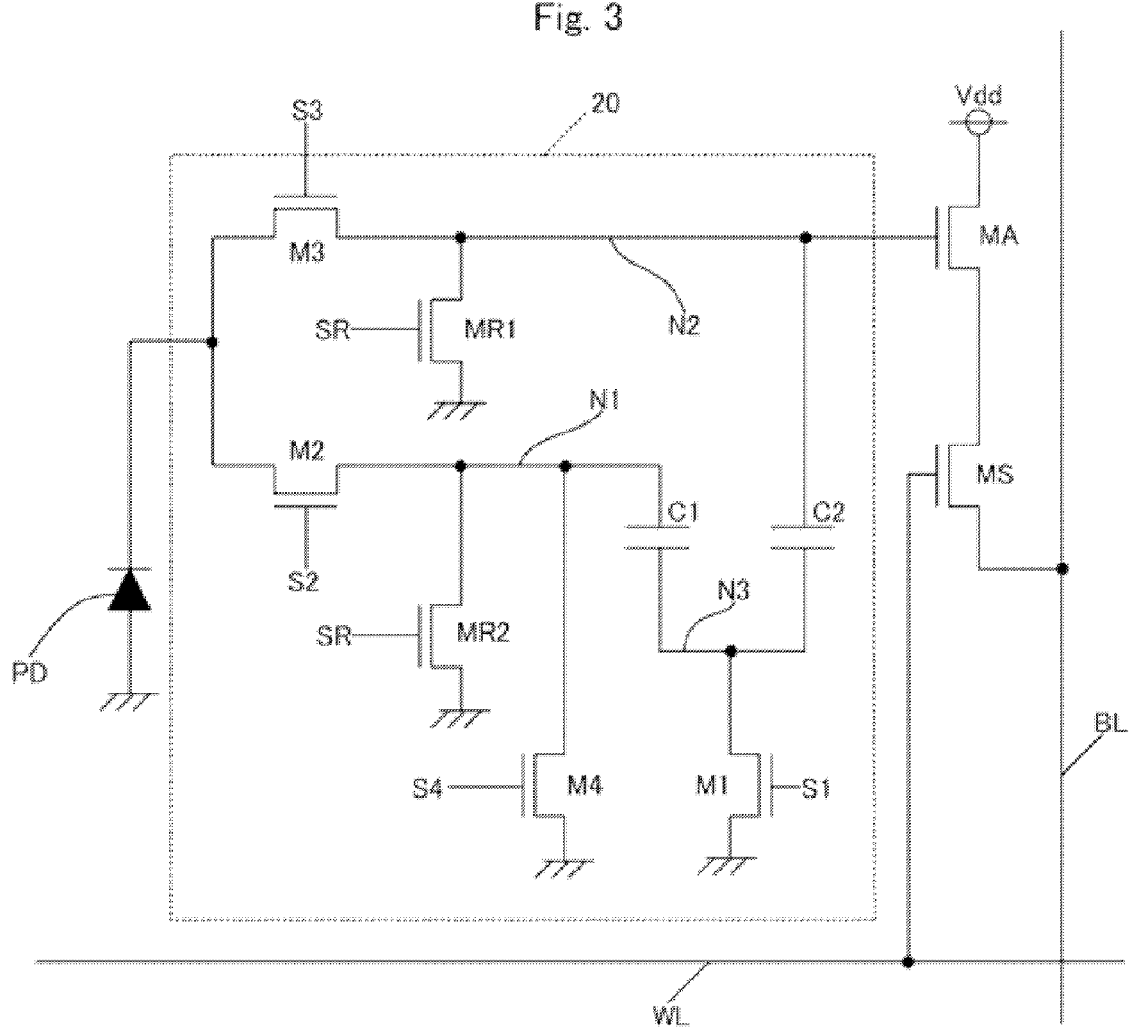
FIG. 3 is a circuit diagram of the CDS circuit 20 of FIG. 2.

FIG. 3 is a circuit diagram of the CDS circuit 20 of FIG. 2. Referring to FIG. 3, the CDS circuit 20 includes MOS transistors M1 to M4, MR1 and MR2, and capacitors C1 and C2. One electrodes of the transistors M3 and M2 are connected with a cathode of the photodiode PD. An anode of the photodiode PD is grounded. The other electrode of the transistor M3 is connected with one electrode of the transistor MR1, a gate of the transistor MA (corresponding to the amplifier MA of FIG. 2), and one terminal of the capacitor C2. The other electrode of the transistor MR1 is grounded. The other electrode of the transistor M2 is connected with one electrodes of the transistors MR2 and M4, and one terminal of the capacitor C1. The other electrodes of the transistors MR2 and M4 are grounded. The other electrodes of the capacitors C1 and C2 are connected with one electrode of the transistor N1. The other electrode of the transistor M1 is grounded.

One electrode of the transistor MA is connected with the power supply Vdd, and the other electrode thereof is connected with one electrode of the transistor MS (corresponding to the switch MS of FIG. 2). The other electrode of the transistor MS is connected with the column signal line BL, and the gate thereof is connected with the row select line WL.

The multiprocessor 3 gives the control signals S1, S2, S3 and S4 to the gates of the transistors M1, M2, M3 and M4 respectively. Also, the multiprocessor 3 gives the reset signal SR to the gates of the transistors MR1 and MR2.

Next, the operation of the CMOS image sensor 1 will be described referring to FIG. 3 and a timing chart.

Figure 4:
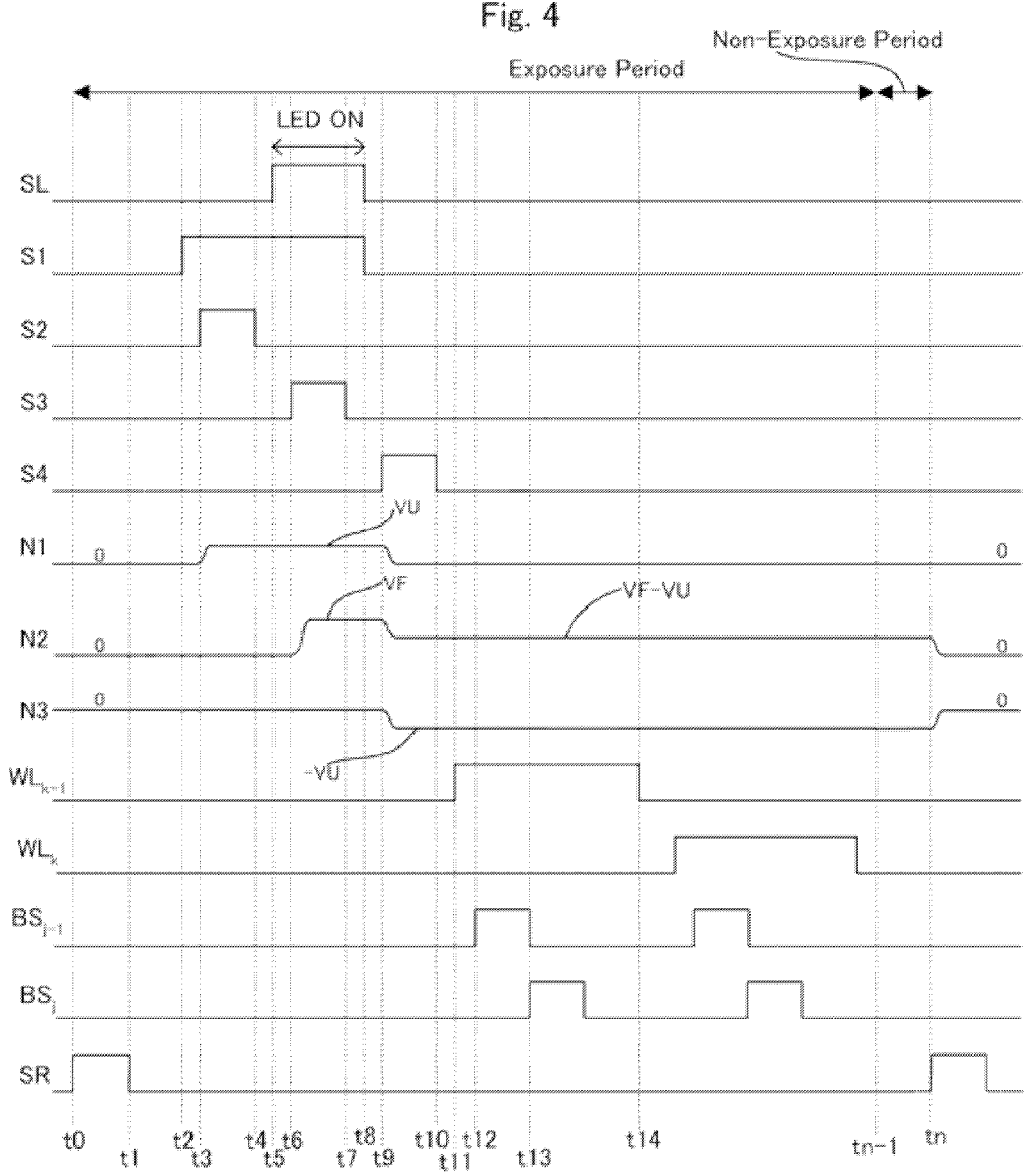
FIG. 4 is a timing chart for explaining the operation of the CMOS image sensor 1 of FIG. 1.

FIG. 4 is the timing chart for explaining the operation of the CMOS image sensor 1 of FIG. 1. Referring to FIG. 4, the multiprocessor 3 set the reset signal SR to a high level at a time t0. As the result, the transistors MR1 and MR2 are turned on, and thereby electric potentials of nodes N1 and N2 become zero. Then, the multiprocessor 3 sets the reset signal SR to a low level at a time t1. As the result, the transistors MR1 and MR2 are turned off.

Then, the multiprocessor 3 sets the control signal S1 to a high level at a time t2. As the result, the transistor M1 is turned on, and electric potential of a node N3 becomes zero. Next, the multiprocessor 3 turns on the control signal S2 at a time t3. As the result, the transistor M2 is turned on, and thereby the capacitor C1 is charged with the pixel signal (the output electric potential) of the photodiode PD. At this time, since the LED driving signal SL is at a low level, the LED 7 is turned off, and therefore the capacitor C1 is charged with the pixel signal in a non-light emitting period. At this time, the electric potential of the node N1 is the value "VU" corresponding to the level of the pixel signal of the photodiode. Incidentally, the transistors MR2 and M4 maintain an OFF state continuously. Then, the multiprocessor 3 sets the control signal S2 to a low level at a time t4. As the result, the transistor M2 is turned off.

The multiprocessor 3 sets the LED driving signal SL to a high level at a time t5. As the result, the LED 7 is turned on. Then, the multiprocessor 3 sets the control signal S3 to a high level at a time t6. As the result, the transistor M3 is turned on, and thereby the capacitor C2 is charged with the pixel signal (the output electric potential) of the photodiode PD. At this time, since the LED driving signal SL is at a high level, the LED 7 is turned on, and therefore the capacitor C2 is charged with the pixel signal in a light emitting period. At this time, the electric potential of the node N2 is the value "VF" corresponding to the level of the pixel signal of the photodiode. Incidentally, the transistor MR1 maintains an OFF state continuously. Then, the multiprocessor 3 sets the control signal S3 to a low level at a time t7. As the result, the transistor M3 is turned off.

The multiprocessor 3 sets the control signal S1 and the LED driving signal SL to a low level at a time t8. As the result, the transistor M1 and the LED 7 are turned off. At this time, the electric potential of the node N1 is "VU", and the electric potential of the node N2 is "VF". Then, the multiprocessor 3 sets to the control signal S4 to a high level at a time t9. As the result, the transistor M4 is turned on. The electric potential of the node N1 changes from "VU" to zero in response thereto, and therefore the electric potential of the node N3 changes from zero to "−VU". Furthermore, the electric potential of the node N2 is lower than "VF" by "VU" in response thereto. That is, the electric potential of the node N2 becomes the value (VF−VU). The electric potential (VF−VU) is the difference between the pixel signal in the period when the LED 7 is turned on in the exposure period and the pixel signal in the period when the LED 7 is turned off in the exposure period.

Then, the multiprocessor 3 sets the control signal S4 to a low level at a time t10. As the result, the transistor M4 is turned off. The vertical scanning circuit 30 sets (activates) the row select line $WL_{k-1}$ to a high level ("k" is any one of integers from 1 to 64) at a time t11. As the result, the transistor MS is turned on, and thereby the voltage (VF−VU) of the node N2 amplified by the transistor MA, i.e., the differential pixel signal is outputted to the column signal line BL. Therefore, the level of the column signal line BL becomes the level corresponding to the level of the differential pixel signal.

At a time t12, the horizontal scanning circuit 40 turns on the column select switch $BS_{j-1}$ ("j" is any one of integers from 1 to 64), i.e., sets the column select signal $BS_{j-1}$ to a high level. As the result, the differential pixel signal of the column signal line BL connected with the column select switch $BS_{j-1}$ is supplied with the output line 60. Then, at a time t13, the horizontal scanning circuit 40 turns off the column select switch $BS_{j-1}$, i.e., sets the column select signal $BS_{j-1}$ to a low level. At the same time, the horizontal scanning circuit 40 turns on the column select switch $BS_j$, i.e., sets the column select signal $BS_j$ to a high level. As the result, the differential pixel signal of the column signal line BL connected with the column select switch BS, is supplied with the output line 60. The horizontal scanning circuit 40 turns on the column select switches BS in series until j=64 to read out the differential pixel signals corresponding to the pixels 10 of one row. Then, after that, the vertical scanning circuit 30 sets the row select line $WL_{k-1}$ to a low level at a time t14.

After reading out the differential pixel signals corresponding to the pixels 10 of one row, the vertical scanning circuit 30 sets (activates) the next row select line $WL_k$ to a high level. Then, again, the horizontal scanning circuit 40 turns on the column select switches BS in series until j=64 to read out the differential pixel signals corresponding to the pixels 10 of one row. Such processing is repeated until k=64, i.e., until reading of all the differential pixel signals of all the pixels is finished.

Then, after a time tn-1 when the differential pixel signals of all the pixel are read out, the multiprocessor 3 sets the reset signal SR to a high level at a time tn. As the result, the transistors MR1 and MR2 are turned on, and thereby the electric potentials of the nodes N1 and N2 become zero.

Incidentally, in FIG. 4, the period t0 to tn-1 is an exposure period of the CMOS image sensor 1 while the period tn-1 to tn is a non-exposure period of the CMOS image sensor 1.

By the way, as described above, in accordance with the present embodiment, the CMOS image sensor 1 generates the difference between the output signals from the pixel 10 in the exposure period. This point is critically different from the prior art, which generates the difference between the pixel signal in the exposure period and the pixel signal in the non-exposure period. Accordingly, it is possible to increase simplicity in utilization of the CMOS image sensor 1 as well as suppressing fixed pattern noise.

For example, as described above, since the CMOS image sensor 1 outputs the difference between the pixel signal in the period when the LED 7 emits the light in the exposure period and the pixel signal in the period when the LED 7 does not emits the light in the exposure period, the multiprocessor 3 is not required complicated control for the CMOS image sensor 1. That is, if the multiprocessor 3 makes the CMOS image sensor output the image signal in the light emitting period and the image signal in the non-light emitting period of the LED 7 separately to calculate the difference therebetween, programming for the multiprocessor 3 is considerably restricted by the specifications of the CMOS image sensor. In this case, the CMOS image sensor has the ascendancy. However, in accordance with the present embodiment, since the CMOS image sensor 1 generates the differential signal in the exposure period, the multiprocessor 3 can have the ascendancy without the restriction on the basis of the specifications of the CMOS image sensor 1.

Also, for example, since the CMOS image sensor 1 outputs the difference between the pixel signal in the period when the LED 7 is turned on in the exposure period and the pixel signal in the period when the LED 7 is turned off in the exposure period, the process for detecting the retroreflective sheet 11 as an object by the multiprocessor 3 becomes simplified. That is, the multiprocessor 3 is not required the process for obtaining the difference between the image in the light emitting period and the image in the non-light emitting period of the LED 7, and therefore it is possible to reduce the processing load thereof. Furthermore, the multiprocessor 3 can detect the retroreflective sheet 11 with high speed. For comparison, if the multiprocessor 3 receives the image in the light emitting period and the image in the non-light emitting period to obtain the difference, since the software obtains the difference, the processing becomes late.

Further, in accordance with the present embodiment, the multiprocessor 3 detects the retroreflective sheet 11 as an object, and then generates the video signal VD and the audio signal AU according to the result of the detection. Therefore, the present system can be widely applied.

Meanwhile, the present invention is not limited to the above embodiments, and a variety of variations and modifications may be effected without departing from the spirit and scope thereof, as described in the following exemplary modifications.

(1) In the above description, although the multiprocessor 3 performs both the control of the CMOS image sensor 1 and the control of the LED driving circuit 5, the discrete information processing apparatuses may control them respectively.

(2) In the above description, although the CDS circuit 20 is disposed for each the pixel 10, the CDS circuit may be disposed not for each pixel 10 but for each column signal line BL to obtain the difference.

(3) In the above description, although the retroreflective sheet 11 is employed as an object because of the simplification of the detection, the retroreflective sheet 11 is not necessarily required as on object.

(4) Although the above description takes the CMOS image sensor for instance, the other image pick-up element (e.g. a CCD image sensor) may be employed if it obtains the difference between the pixel in the different exposure spans to output the differential pixel signal.

(5) In the above description, although the difference, which is a difference between the pixel signal in the period when the LED 7 is turned on in the exposure period and the pixel signal in the period when the LED 7 is turned off in the exposure period, is outputted, this case is just one example of the utilization of the CMOS image sensor 1, and therefore the CMOS image sensor 1 may be optionally controlled in accordance with the use and purpose thereof. For example, it generates the difference between the pixel signals in the different exposure spans without depending on an external element.

(6) In the above description, although the multiprocessor 3, which generates the video signal VD and the audio signal AU, controls the CMOS image sensor 1, an MCU (Micro Controller Unit) which does not have such function may control the CMOS image sensor 1.

While the present invention has been described in detail in terms of embodiments, it is apparent that those skilled in the art will recognize that the invention is not limited to the embodiments as explained in this application. The present invention can be practiced with modification and alteration within the spirit and scope of the present invention as defined by the appended any one of claims.

The invention claimed is:

1. An image sensor comprising:
a plurality of light receiving elements arranged in a reticular pattern; and
a plurality of difference circuits, each of the difference circuits corresponding to a respective one of the plurality of the light receiving elements, each of the difference circuits including:
a first capacitor configured to be charged with a first signal, the first signal being generated by the respective light receiving element in a first period; and
a second capacitor configured to be charged with a second signal, the second signal being generated by the respective light receiving element in a second period,
wherein the difference circuit selectively generates a third signal, after the first and second periods, the third signal being a function of a voltage on the first capacitor and a voltage on the second capacitor, the third signal indicating a difference between the first signal and the second signal.

2. The image sensor as claimed in claim 1 wherein light reflected by a retroreflective member is inputted to the light receiving element.

3. The image sensor as claimed in claim 1 wherein the difference circuit is controlled by a control signal from an external information processing unit which operates in accordance with a computer program.

4. The image sensor as claimed in claim 1 wherein the image sensor is a CMOS image sensor.

5. The image sensor as claimed in claim 1 wherein a terminal of the first capacitor is connected to a terminal of the second capacitor.

6. The image sensor as claimed in claim 1 wherein the first signal is supplied to a first node in the first period, the first node being connected to a first terminal of the first capacitor, and a second node is set to a potential of a first predetermined level in the first period, the second node being connected to a second terminal of the first capacitor, and
wherein the second signal is supplied to a third node in the second period, the third node being connected to a first terminal of the second capacitor, and a fourth node is set to the potential of the first predetermined level in the second period, the fourth node being connected to a second terminal of the second capacitor.

7. The image sensor as claimed in claim 6 wherein the difference circuit selectively generates the third signal by setting the first node to a potential of a second predetermined level after the first period and the second period.

8. The image sensor as claimed in claim 7 wherein the difference circuit further includes:
an output unit configured to be connected to the third node, and output a potential of the third node to a shared signal line.

9. The image sensor as claimed in claim 1 wherein the first period is a period when a light emitting element does not emit light, and
wherein the second period is a period when the light emitting element emits the light.

10. The image sensor as claimed in claim 1 wherein the image sensor outputs a differential image signal that contains differential pixel signals which indicate the differences in the difference circuits.

11. An image sensor system comprising:
an image sensor; and
a light emitting element,
wherein the image sensor including:
a plurality of light receiving elements arranged in a reticular pattern; and
a plurality of difference circuits, each of the difference circuits corresponding to a respective one of the plurality of the light receiving elements, each of the difference circuits including:
a first capacitor configured to be charged with a first signal, the first signal being generated by the respective light receiving element in a first period; and
a second capacitor configured to be charged with a second signal, the second signal being generated by the respective light receiving element in a second period,
wherein the difference circuit selectively generates a third signal, after the first and second periods, the third signal being a function of a voltage on the first capacitor and a voltage on the second capacitor, the third signal indicating a difference between the first signal and the second signal,
wherein the light emitting element does not emit light in the first period, and emits the light in the second period.

12. The image sensor system as claimed in claim 11 further comprising:
an information processing unit configured to receive a differential image signal from the image sensor, and detect, from the differential image signal, an object picked up by the image sensor, and wherein the differential image signal contains differential pixel signals which indicate the differences in the difference circuits.

13. The image sensor system as claimed in claim 12 wherein the information processing unit includes:
a video generating unit operable to generate a video signal based on a detection result of the object.

14. The image sensor system as claimed in claim 13 wherein the information processing unit further includes:
an audio generating unit operable to generate an audio signal based on the detection result of the object.

15. The image sensor system as claimed in claim 12 wherein the information processing unit includes:
an audio generating unit operable to generate an audio signal based on a detection result of the object.

16. The image sensor system as claimed in claim 12 wherein the object is a retroreflective member, the retroreflective member being worn on a part of a person, or being attached to an article, which a person moves.

17. The image sensor system as claimed in claim 11 wherein the light which the light emitting element emits is infrared light,
the image sensor system further comprising:
an infrared light filter through which only infrared light passes,
wherein the image sensor picks up an image through the infrared light filter.

18. The image sensor system as claimed in claim 11 wherein the image sensor is a CMOS image sensor.

19. The image sensor as claimed in claim 11 wherein a terminal of the first capacitor is connected to a terminal of the second capacitor.

20. The image sensor system as claimed in claim 11 wherein the first signal is supplied to a first node in the first period, the first node being connected to a first terminal of the first capacitor, and a second node is set to a potential of a first predetermined level in the first period, the second node being connected to a second terminal of the first capacitor, and
wherein the second signal is supplied to a third node in the second period, the third node being connected to a first terminal of the second capacitor, and a fourth node is set to the potential of the first predetermined level in the second period, the fourth node being connected to a second terminal of the second capacitor.

21. The image sensor system as claimed in claim 20 wherein the difference circuit selectively generates the third signal by setting the first node to a potential of a second predetermined level after the first period and the second period.

22. The image sensor system as claimed in claim 21 wherein the difference circuit further includes:
an output unit configured to be connected to the third node, and output a potential of the third node to a shared signal line.

* * * * *